US011924946B1

(12) United States Patent
Leinen

(10) Patent No.: US 11,924,946 B1
(45) Date of Patent: Mar. 5, 2024

(54) OCCUPANCY SENSING SYSTEM WITH VERBAL NOTIFICATION

(71) Applicant: Leviton Manufacturing Co., Inc., Melville, NY (US)

(72) Inventor: Richard A. Leinen, Wilsonville, OR (US)

(73) Assignee: Leviton Manufacturing Co. Inc., Melville, NY (US)

( * ) Notice: Subject to any disclaimer, the term of this patent is extended or adjusted under 35 U.S.C. 154(b) by 0 days.

(21) Appl. No.: 17/968,991

(22) Filed: Oct. 19, 2022

(51) Int. Cl.
*H05B 47/12* (2020.01)

(52) U.S. Cl.
CPC .................................... *H05B 47/12* (2020.01)

(58) Field of Classification Search
CPC ...... H05B 47/115; H05B 47/19; H05B 47/13; H05B 47/11; H05B 47/16; H05B 47/10; H05B 47/20; H05B 39/081; H05B 39/085; H05B 47/17; H05B 47/175; G08B 13/1968; H02J 2310/14; H02J 3/00; H02J 3/14
See application file for complete search history.

(56) References Cited

U.S. PATENT DOCUMENTS 8,228,184 B2 * 7/2012 Blakeley .............. G08B 29/181 340/541
8,665,090 B2 * 3/2014 Bull ..................... H05B 39/081 340/541
9,035,769 B2 * 5/2015 Steiner ................... H05B 47/16 315/159
9,148,937 B2 * 9/2015 Steiner ................... H05B 47/19
9,265,128 B2 * 2/2016 Steiner ................. H05B 47/115
9,271,375 B2 * 2/2016 Balasubramanian .. H05B 47/19
9,880,534 B2 * 1/2018 Hick ...................... G05B 15/02
9,930,753 B2 * 3/2018 Balasubramanian .. H05B 47/19
10,098,206 B2 * 10/2018 Steiner .................. H05B 47/13
10,299,348 B2 5/2019 Carberry
10,462,882 B2 * 10/2019 Steiner ................... H05B 47/13
11,129,262 B2 * 9/2021 Steiner ................... H05B 47/13
11,490,248 B2 * 11/2022 Baker ................... H04W 12/02
2008/0273754 A1 * 11/2008 Hick ...................... G06V 10/25 382/103
2012/0147705 A1 6/2012 Hick
2013/0181617 A1 7/2013 Maddox
2016/0126733 A1 * 5/2016 Hick ...................... H05B 47/11 700/295
2017/0105268 A1 * 4/2017 Balasubramainian ....................... H05B 47/10
2018/0136620 A1 * 5/2018 Hick ...................... G05B 15/02

* cited by examiner

*Primary Examiner* — Monica C King
(74) *Attorney, Agent, or Firm* — KDW FIRM PLLC

(57) ABSTRACT

An occupancy sensing system and/or an occupancy sensor including a transmitter arranged and configured to provide a verbal (i.e., audio) notification before changing a state of a load such as, for example, turning OFF a load (e.g., lights, etc.) coupled thereto. In some embodiments, at a predetermined period of time prior to changing the state of the load, the occupancy sensor emits a verbal notification to elicit feedback from any occupant who may be present in the monitored space. In response, the occupant may respond with a verbal confirmation and/or by moving. In some embodiments, the transmitter may be a speaker for transmitting a verbal notification. Alternatively, the transmitter may be a wireless transmitter for communicating with a remote device for relaying the verbal notification.

20 Claims, 6 Drawing Sheets

OCCUPANCY SENSING SYSTEM WITH VERBAL NOTIFICATION

FIELD OF THE DISCLOSURE

The present disclosure relates generally to occupancy sensors or occupancy sensing systems, and more particularly to an improved occupancy sensor having verbal notification.

BACKGROUND OF THE DISCLOSURE

Utilization of occupancy sensors or systems (terms used interchangeably herein without the intent to limit or distinguish) have become commonplace in today's society. Occupancy sensors are designed to save energy by detecting the presence of a moving object (e.g., a person) in a monitored space and switching an electrical load such as, for example, a light source, ON and OFF depending upon the presence of the moving object. For example, when motion is detected within the monitored space, the light source is turned ON. Alternatively, when motion is no longer detected for a predetermined period of time, indicating that the area of coverage is not occupied, the light source is turned OFF. Occupancy sensors thus facilitate electrical energy savings by automating the functions of a light switch.

Generally speaking, occupancy sensors can use any of a number of different sensing technologies to detect the presence of a person. Sensing technologies used with occupancy sensors can generally be characterized as either active or passive technologies. Passive technologies do not involve the active emission of energy in the monitored space. Rather, passive technologies rely on the detection of energy given off by the occupants themselves, or reflected by the occupants from ambient sources. For example, passive infrared (PIR) sensing relies on the fact that the thermal energy of warm objects causes them to emit infrared radiation (e.g., PIR occupancy sensors operate by sensing a body having a heat signature in excess of background infrared (IR) levels). During use, the infrared radiation may be sensed by a photocell which converts the radiation to electric signals for further processing. Another type of passive occupancy sensing technology is video sensing which relies on ambient light that is reflected by an occupant and detected by a video sensor such as a charge coupled device (CCD).

With active technologies, some type of energy is emitted from the occupancy sensor into the monitored space. The emitted energy is reflected by an occupant (when present) and converted into an electric signal by a suitable sensor. An example of an active occupancy sensing technology is ultrasonic sensing. In an ultrasound system, the monitored space is flooded with ultrasonic waves that are constantly emitted by an ultrasound driver. An ultrasound sensor detects waves that are reflected by an occupant and/or other objects in the monitored space. By comparing the emitted and reflected waves, an ultrasonic system can determine whether an object is moving. Moving objects are assumed to be occupants.

Some occupancy sensors use a combination of sensing technologies. For example, PIR is generally more accurate for detecting large motion such as a person walking into a monitored space in a path that is directly within the line-of-sight of the occupancy sensor. Ultrasound systems tend to be more sensitive for detecting smaller motion, such as a person working at a desk, and motion that is hidden from the line-of-sight of the occupancy sensor, such as behind partitions in an office or restroom. The added sensitivity, however, may cause false "occupied" readings. Therefore, an occupancy sensor may initially use PIR sensing to determine that the monitored space has become occupied. Once the space is initially determined to be occupied, an occupied reading from either PIR or ultrasound may be used to determine that the space continues to be occupied.

Other known sensing technologies apart from PIR and ultrasonic include acoustic (e.g., microphonic), microwave, video, and the like.

In addition, occupancy sensors typically incorporate a countdown timer to keep the lights on only for a predetermined period of time unless occupancy is sensed again during the countdown time period. During use, a countdown timer is set to a predetermined maximum value such as, for example, 2 minutes, 5 minutes, 10 minutes, 30 minutes, or the like. When occupancy is initially sensed and the lights are turned ON, the countdown timer begins to decrement toward zero. Each occupied reading from the sensing technology causes the timer to reset to the maximum value. If the timer decrements all the way to zero before another occupancy event is detected, the monitored space is assumed vacant and the lights are turned OFF.

As will be readily appreciated by one of ordinary skill in the art, all of these sensing technologies have their benefits and disadvantages. Used in combination, each strength can be used to overcome another's weakness. Still, there are occasions when lights are turned OFF on occupants because they were not detected (e.g., due to lack of motion detection).

It would, therefore, be desirable to provide an improved occupancy sensor that prevents, or at least minimizes, turning OFF the lights while an occupant remains within the monitored space.

It is with respect to these and other considerations that the present disclosure may be useful.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure is directed to an occupancy sensing system and/or an occupancy sensor. In either scenario, a transmitter is included. The transmitter being arranged and configured to transmit a verbal notification before changing the state of a load such as, for example, before turning an electrical load, such as, for example, lights, OFF. That is, for example, in some embodiments, the occupancy sensing system and/or the occupancy sensor includes a countdown timer, which when it reaches zero, turns OFF the connected load (e.g., lights). In accordance with one or more features of the present disclosure, at a predetermined period of time prior to the countdown timer reaching zero, a verbal notification to elicit feedback from any occupant located in the monitored space is transmitted.

In some embodiments, the occupancy sensor may be configured as a wall box sensor arranged and configured to be positioned within a standard single gang wall box. Alternatively, the occupancy sensor may be configured as a ceiling mounted sensor or may be part of a larger networked system.

In some embodiments, the verbal notification may be emitted at 10 seconds, 20 seconds, 30 seconds, or the like, prior to the countdown timer reaching zero.

In some embodiments, the source of the verbal notification can vary. For example, in some embodiments, the occupancy sensor may include a speaker located within the enclosure or housing of the sensor (e.g., the transmitter is a speaker arranged and configured to transmit a verbal notification). Alternatively, for larger, networked systems, one or more audio components house separately from the occupancy sensor component(s) could be part of the system. Alternatively, in connection with connected homes or offices, the emitted verbal notification may come from Siri, Alexa, or the like (e.g., the transmitter is arranged and configured to transmit a signal to a connected Siri, Alexa, or the like for relaying the verbal notification). In other embodiments, the transmitter may be a wireless transmitter arranged and configured to wirelessly connect to a remote device such as, for example, an occupant's smartphone, tablet, computer, or the like (e.g., the occupancy sensor may be in wireless communication with an APP located on an occupant's smartphone, tablet, computer, or the like). In such embodiments, the verbal notification may be transmitted to and relayed by the occupant's smartphone, tablet, computer, or the like. Alternatively, in some embodiments, the emitted verbal notification may be a message, or some other notification, transmitted by the smartphone, tablet, computer, or the like. In some embodiments, the verbal notification may be a verbal command such as, for example, "lights scheduled to turn OFF in 30 seconds" or "Is anyone in the room?"

In either event, in response to the verbal notification, the user can move and/or respond to maintain the lights ON. For example, in response to hearing the verbal notification, the user can move, which movement may be detected by the occupancy sensing technology thereby resetting the countdown timer and maintaining the lights ON. Alternatively, and/or in addition, the occupancy sensor may include, or be communicatively coupled to, a microphone so that in response to hearing the verbal notification, the user can verbally respond thereby resetting the countdown timer and maintaining the lights ON.

In use, the occupancy sensing system and/or the occupancy sensor provide one or more additional layers of protection from false OFFs by allowing the system and/or sensor to verbally notify any occupants that the state of the load is going to be changed (e.g., lights are going to be turned OFF). In response, any occupant in the monitored space, can either verbally override the state of the load from changing (e.g., override the lights from being turned OFF) by responding to the occupancy system and/or sensor, or by simply moving to be noticed by the occupancy sensing system and/or sensor and thereby resetting the countdown timer to its maximum valve, or some other preset value.

In one embodiment, an occupancy sensing system is disclosed. The occupancy sensing system being arranged and configured to monitor occupancy in a monitored space. The occupancy sensing system being arranged and configured to transmit a state change signal to change a state of a load upon determining the monitored space is vacant. In some embodiments, the occupancy sensing system includes an occupancy sensor including a processor and a receiver arranged and configured to detect a presence of an occupant in the monitored space, the receiver arranged and configured to receive a signal that indicates the monitored space is occupied. The occupancy sensing system further including a transmitter operatively connected to the occupancy sensor, the transmitter arranged and configured to transmit a verbal notification at a predetermined time prior to changing the state of the load, wherein upon receiving the signal that indicates the monitored space is occupied, canceling the operation to change the state of the load.

In some embodiments, the occupancy sensing system further includes a load control device arranged and configured to selectively change the state of the load in response to determining that the monitored space is vacant, the load control device communicatively coupled to the occupancy sensor and a countdown timer arranged and configured to count down from a maximum value to zero, wherein the transmitter includes a speaker arranged and configured to transmit the verbal notification at the predetermined time prior to the countdown reaching zero.

In some embodiments, the occupancy sensor further includes a housing. The processor, the receiver, the load control device, the countdown timer, and the transmitter are all positioned within the housing of the occupancy sensor.

In some embodiments, the occupancy sensor further includes a housing. The processor and the receiver are positioned within the housing of the occupancy sensor, the transmitter is positioned in a separate housing from the housing of the occupancy sensor.

In some embodiments, the countdown timer is arranged and configured to reset to the maximum value upon receiving the signal indicating that the monitored space is occupied.

In some embodiments, when the countdown timer reaches zero, the state change signal is transmitted and the state of the load is changed.

In some embodiments, the receiver is selected from one of a passive infrared (PIR) sensor, an ultrasonic sensor, an acoustic sensor, a video sensor, a microwave sensor, and a combination thereof.

In some embodiments, the verbal notification is transmitted within the monitored space to elicit feedback from any occupant in the space.

In some embodiments, the verbal notification is arranged and configured to inform any occupant in the monitored space that the state of the load is about to be changed.

In some embodiments, in response to the verbal notification, receipt of the signal that indicates the monitored space is occupied, resets the countdown timer to the maximum value.

In addition, an occupancy sensor is disclosed. The occupancy sensor being arranged and configured to monitor occupancy in a monitored space. The occupancy sensor including a housing, a processor, an occupancy sensing element (e.g., a receiver) arranged and configured to detect a presence of an occupant in the monitored space, the occupancy sensing element communicatively coupled to the processor, a load control device arranged and configured to selectively change a state of a load coupled thereto, the load control device communicatively coupled to the processor, a countdown timer arranged and configured to count down from a maximum value to zero, the countdown timer communicatively coupled to the processor, and a transmitter arranged and configured to transmit a notification at a predetermined time prior to the countdown reaching zero, wherein the transmitter is one of a speaker arranged and configured to transmit a verbal notification and a wireless transceiver arranged and configured to transmit a notification to a remote device.

In some embodiments, the occupancy sensing element is selected from one of a passive infrared (PIR) sensor, an ultrasonic sensor, an acoustic sensor, a video sensor, a microwave sensor, and a combination thereof.

In some embodiments, the countdown timer is arranged and configured to reset to the maximum value every time the presence of the occupant is detected.

In some embodiments, when the countdown timer reaches zero, a signal is transmitted to the processor and the load is turned OFF.

In some embodiments, the notification is a verbal notification transmitted within the monitored space to elicit feedback from any occupant in the space.

In some embodiments, the verbal notification is arranged and configured to inform any occupant in the space that the state of the load is about to change.

A method for controlling a load in a monitored space is also disclosed. The method including detecting occupancy via an occupancy sensor in the monitored space, initiating a countdown time, the countdown timer decrementing from a maximum value to zero, resetting the countdown timer to the maximum value upon each occurrence of occupancy detection, transmitting a verbal notification at a predetermined period of time prior to the countdown timer reaching zero, and one of changing a state of the load upon the countdown timer reaching zero or resetting the countdown timer to the maximum value in response to detecting occupancy from the transmission of the notification.

In some embodiments, the verbal notification is transmitted by the occupancy sensor indicating that the load is about to be changed.

In some embodiments, in response to the verbal notification, an occupant physically moves.

In some embodiments, in response to the verbal notification, an occupant provides a verbal response.

BRIEF DESCRIPTION OF THE DRAWINGS

By way of example, specific embodiments of the disclosed device will now be described, with reference to the accompanying drawings, in which.

Figure 1:
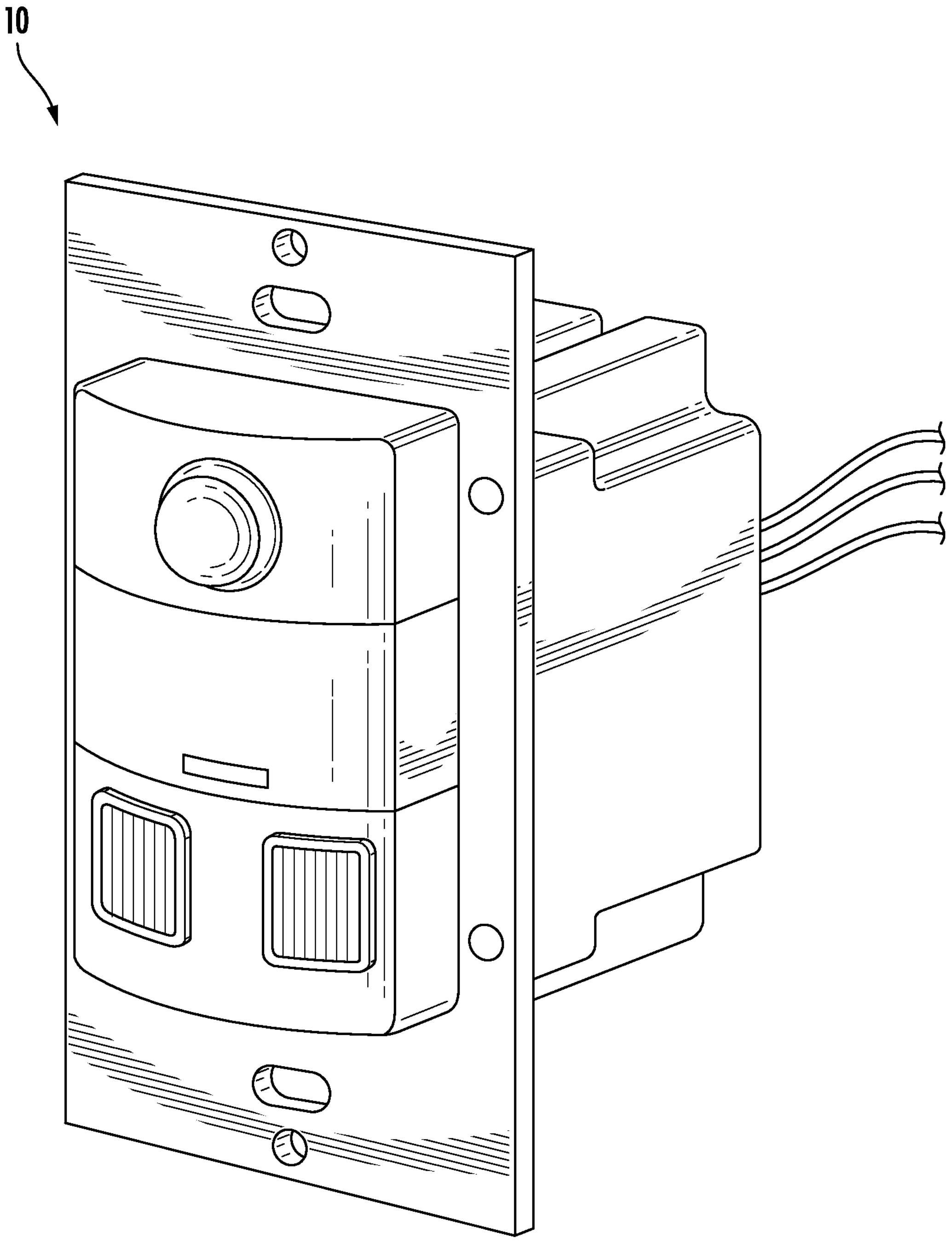
FIG. 1 illustrates a perspective view of an embodiment of a conventional wall box mounted occupancy sensor.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein. In the drawings, like numbers refer to like elements throughout unless otherwise noted.

DETAILED DESCRIPTION

Various features or the like of an occupancy sensing system, an occupancy sensor, a vacancy sensor, and/or a vacancy sensing system (terms used interchangeably herein) will now be described more fully herein with reference to the accompanying drawings, in which one or more features of the occupancy sensor will be shown and described. It should be appreciated that the various features may be used independently of, or in combination, with each other. It will be appreciated that the occupancy sensor as disclosed herein may be embodied in many different forms and may selectively include one or more concepts, features, or functions described herein. As such, the occupancy sensor should not be construed as being limited to the specific embodiments set forth herein. Rather, these embodiments are provided so that this disclosure will convey certain features to those skilled in the art.

In accordance with one or more features of the present disclosure, an occupancy sensor including a transmitter such as, for example, a speaker and/or a wireless transmitter, for transmitting a verbal notification before a perceived vacancy is disclosed. For example, as will be described herein in greater detail, in a preferred embodiment, the occupancy sensor may include a transmitter such as, for example, a speaker and/or a wireless transmitter, for transmitting a verbal notification before turning an electrical load such as, for example, lights, OFF is disclosed. That is, for example, in some embodiments, an occupancy sensor includes a countdown timer, which counts down or decrements following motion detection. In use, if subsequent motion is detected, the countdown timer resets to a maximum value, or some other preset value. However, when the countdown timer reaches zero, a signal is transmitted and the electrical load (e.g., lights) coupled to the occupancy sensor is turned OFF. In accordance with one or more features of the present disclosure, during the countdown timer period, at a predetermined period of time prior to reaching zero and turning OFF the lights, the occupancy sensor emits a verbal notification to elicit feedback from any occupant located in the monitored space. As used herein, the term "OFF" should be broadly construed to include turning the lights OFF. In addition, OFF could include dimming the lights, fade to OFF, etc.

In accordance with one or more features of the present disclosure, while the preferred embodiments will be described in connection with an occupancy sensor transmitting a signal to activate a verbal notification before turning an electrical load such as, for example, lights, OFF, it should be appreciated that the present disclosure should not be so limited unless explicitly claimed. For example, in some embodiments, the occupancy sensor may be arranged and configured to operate in alternative modes such as, for example, an overnight mode or turning ON an alarm system after vacancy is determined. As such, in accordance with one or more features of the present disclosure, a verbal notification can be transmitted prior to the sensor, or networked system, reacts to a perceived vacancy.

As used herein, the term "verbal" includes any kind of audible communication such as, for example, a human recording, human speech such as, for example, recorded human speech, a computer generated recording, or the like, that informs a user that the load is about to be turned OFF. In some embodiments, the verbal notification may be an audio notification stating, for example, "lights scheduled to turn OFF in 30 seconds" or "Is anyone in the room?".

As such, in use, the occupancy sensor provides one or more additional layers of protection from false OFFs by allowing the sensor to verbally notify the occupants that the state of a connected load is going to change (e.g., lights are going to be turned OFF). In response, any occupant in the monitored space, can either verbally override the state change (e.g., lights from being turned OFF) by responding to the occupancy sensor and/or by simply moving to be noticed by the occupancy sensor and thereby resetting the countdown timer to its maximum valve, or some other preset value.

Generally speaking, and as will be readily appreciated by one of ordinary skill in the art, an occupancy sensor may be installed within a monitored space for monitoring the space for occupancy. The monitored space may be any space where occupants may be present, for example, an office, a meeting room, a restroom, a hotel room, a stairwell, or the like. In some embodiments, as generally illustrated in FIG. 1, the occupancy sensor 10 can be configured as a wall-mounted occupancy sensor and may be mounted adjacent to, for example, one or more doorways within the monitored space. Alternatively, in some embodiments, with reference to FIG. 2, the occupancy sensor 10' can be configured as a ceiling mounted occupancy sensor and can be installed on a ceiling of the monitored space. Alternatively, and/or in addition, multiple occupancy sensors 10, 10' can be mounted within the monitored space. In some embodiments, the occupancy sensor 10, 10' can be part of a system including, for example, a central processor which can combine the information received from all occupancy sensors to make a determination regarding an occupancy state of the monitored space. In some embodiments, each of the occupancy sensors may include their own local processors or circuitry for performing pre-processing and/or signal conditioning prior to sending signals to the central processor.

Figure 3A:
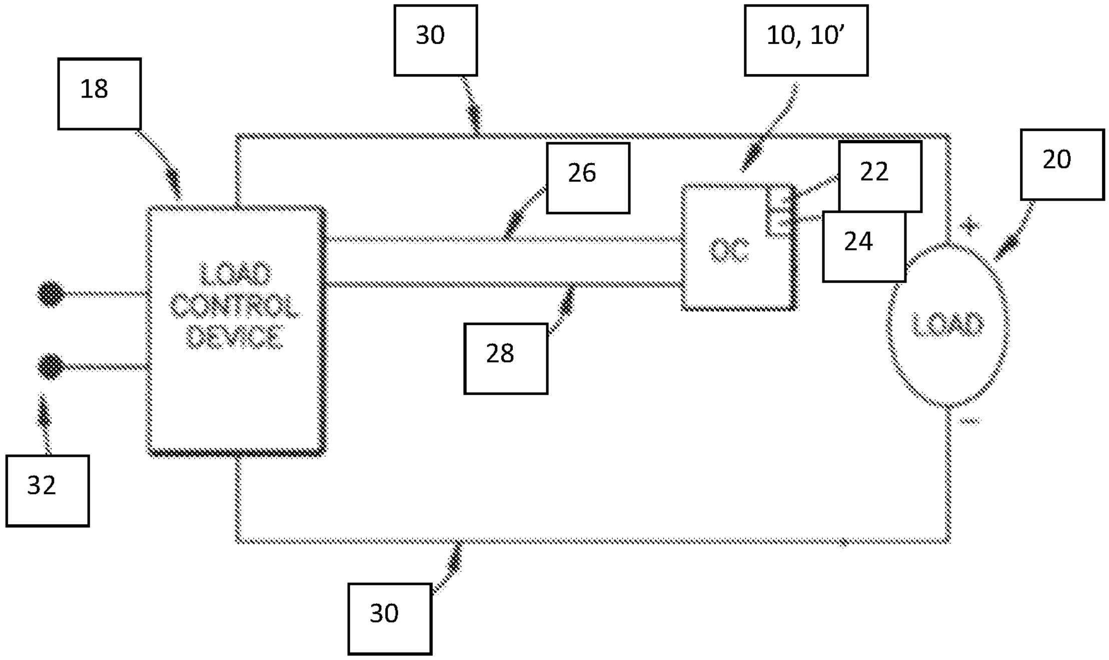
FIGS. 3A and 3B illustrate schematic diagrams of an embodiment of an occupancy sensor.
Figure 3B:
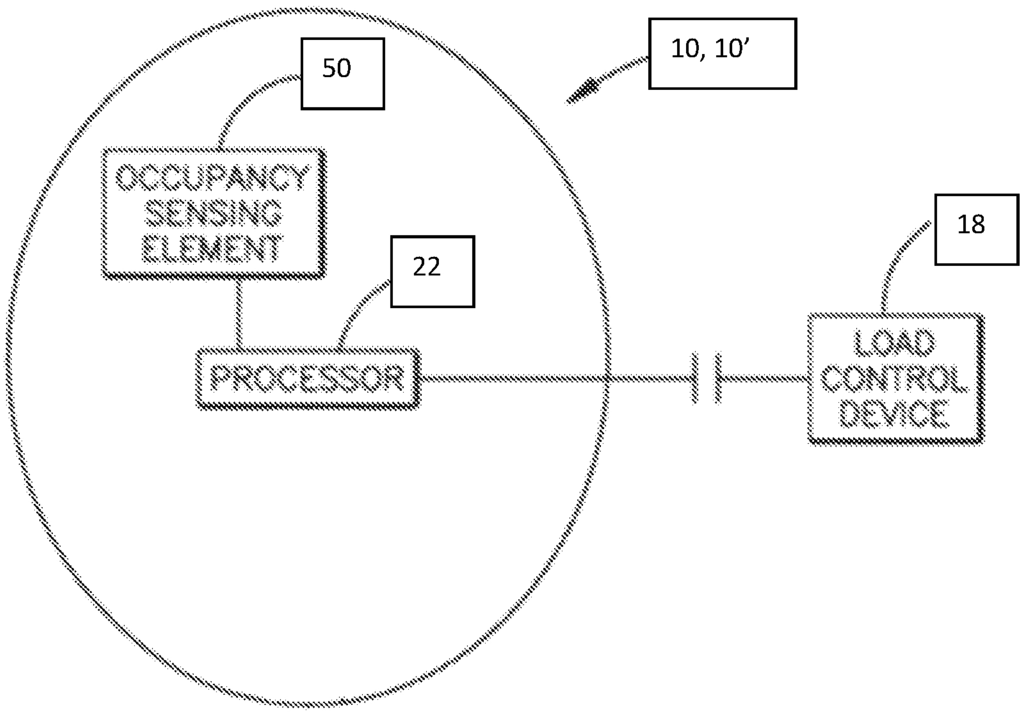

With reference to FIGS. 3A and 3B, an embodiment of an occupancy sensor 10, 10' coupled to a load control device 18 and a load 20 is illustrated. Generally speaking, the occupancy sensor 10, 10' may include a processor or a micro-controller 22 (terms used interchangeably herein) configured to control one or more operational aspects of the occupancy sensor 10, 10'. The processor 22 may also be configured to control and decode communication signals sent between the occupancy sensor 10, 10' and the load control device 18 via signal line 28. Memory 24 may be associated with the processor 22 for storing operational and configuration information relating to the occupancy sensor 10, 10' and/or other elements of the system. The memory 24 may be any of a variety of volatile or non-volatile memory devices now or hereinafter known by those of ordinary skill in the art.

The occupancy sensor 10, 10' may receive power from the load control device 18 via the power line 26, and may transmit signals (e.g., occupancy signals) to the load control device 18 via signal line 28. In response to signals received from the occupancy sensor 10, 10', the load control device 18 may energize the load 20 via one or more power lines 30. In some embodiments, the load 20 may include at least one light, although this is but one configuration and the load can be any of a variety of electrical loads, such as, but not limited to, lighting, heating, ventilation and the like. The load control device 18 may receive line power from a building power source 32.

When the load control device 18 receives an occupancy signal from the occupancy sensor 10, 10', it may control operation of the associated load 20 accordingly. For example, when the occupancy sensor 10, 10' transmits a signal to the load control device 18 communicating that the space is occupied (e.g., motion has been detected), the load control device 18 may energize the load 20 by providing power via the power line 30.

Although the illustrated embodiments include a single occupancy sensor 10, 10', a single load control device 18, and a single load 20, it will be appreciated by those of ordinary skill in the art that any number of sensors, loads and/or load control devices may be used in combination to provide an occupancy sensing system having a desired functionality and coverage. For example, it will be appreciated that a space, may be monitored by multiple occupancy sensors. In addition, one or more loads may be associated with each occupancy sensor. Alternatively, one or more occupancy sensors may be associated with each load. Further combinations of components are contemplated, as will be appreciated by one of ordinary skill in the art.

In addition, although the occupancy sensor 10, 10' and the load control device 18 are illustrated as being separate components, in some embodiments the occupancy sensor 10, 10' may include internal load control functionality, eliminating the need for a separate load control device 18.

As illustrated in FIG. 3B, the occupancy sensor 10, 10' includes an occupancy sensing element 50 (e.g., a receiver arranged and configured to detect a presence of an occupant in the monitored space (i.e., to receive a signal that indicates the monitored space is occupied). As previously mentioned, the occupancy sensing element 50 may be any suitable sensor technology now known or hereafter developed, such as, for example, passive infrared sensors (PIR), ultrasonic sensors (US), dual infrared-ultrasonic sensors, acoustic sensors, video sensors, microwave sensors, and the like.

In some embodiments, the occupancy sensor may also include a wireless transceiver to enable wireless communication. In use, the wireless transceiver may enable any suitable wireless transmission technologies. Thus arranged, in use, the occupancy sensor may be wirelessly connected to an APP running on a remote device such as, for example, a smartphone, a tablet, a computer, or the like, to enable, for example, setup, configuration, remote operations, or the like. Alternatively, the occupancy sensor may be configured to wirelessly communicate with other sensors or load control devices in a networked system. For example, in systems in which a plurality of wirelessly enabled occupancy sensors are provided, the individual sensors may be able to communicate with each other. For example, one sensor may be coupled to a load control device (either internally or externally) so that it can operate to turn ON/OFF a connected load based on its own occupancy signal or an occupancy signal received wirelessly from another wireless occupancy sensor. For applications having multiple wirelessly enabled occupancy sensors, building management personnel may connect to each sensor remotely and set their schedules using a wireless router.

In further embodiments, the wireless occupancy sensor may be able to communicate with other types of wireless devices such as, but not limited to, a wireless wall switch. In such cases, the wireless wall switch may be configured to override the occupancy sensor when the switch is turned ON, and/or reset the wireless occupancy sensor to normal operations when the switch is turned OFF.

While particular embodiments of occupancy sensors have been shown and described, it should be understood that the configuration and operation of occupancy sensors is relatively well known in the art, thus for the sake of brevity further description on the configuration and operation of conventional occupancy sensors is omitted herefrom. Additional information of various embodiments of occupancy sensors can be found in U.S. patent application Ser. No. 13/775,534, now U.S. Pat. No. 9,271,375, entitled "System and Method for Occupancy Sensing with Enhanced Functionality", and U.S. patent application Ser. No. 13/352,124, entitled "Occupancy Sensing with Selective Emission," the entire contents of which are incorporated herein by reference. It should be understood that the present disclosure is not limited to any particular configuration of occupancy sensor and thus the present disclosure should only be limited by the claims.

Figure 4:
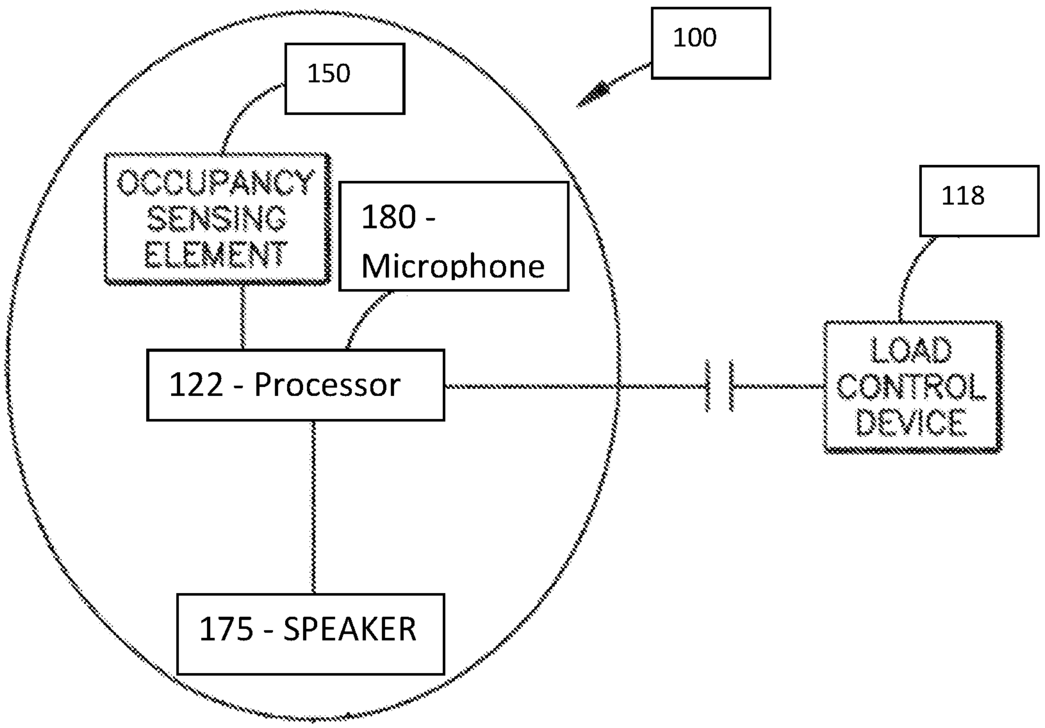
FIG. 4 illustrates a schematic diagram of an exemplary occupancy sensor in accordance with one or more features of the present disclosure.

With reference to FIG. 4, in accordance with one or more features of the present disclosure, the occupancy sensor 100 is arranged and configured to provide notification such as, for example, verbal notification, prior to changing the state of the connected load (e.g., prior to turning OFF the connected load (e.g., lights)). For example, as illustrated, the occupancy sensor 100 may include a processor 122 and an occupancy sensing element (e.g., receiver) 150. In addition, as illustrated, the occupancy sensor 100 includes, or may be operatively coupled to, a load control device 118, which is coupled to a load. In addition, as previously mentioned, the occupancy sensor 100 includes a countdown timer, which is arranged and configured to initiate counting down or decrementing from a maximum value (e.g., 100 percent) to zero (e.g., zero percent) following motion detection. In addition, as will be described in greater detail herein, the occupancy sensor 100 also includes a transmitter such as, for example, a speaker 175 or a wireless transmitter. The transmitter being operatively coupled to the processor 122.

The countdown timer may be any suitable timer now known or hereafter developed. For example, in some embodiments, the countdown timer may be embodied as a digital word that is reset and decremented by the processor, or as a separate timer circuit in the processor. In an analog implementation, the countdown timer may be embodied as a voltage on a capacitor that is discharged by a constant current.

In use, if subsequent motion is detected, the countdown timer resets to the maximum value, or some other preset value. However, when the countdown timer reaches zero, a signal is transmitted and the state of the load (e.g., lights) coupled to the occupancy sensor is changed (e.g., turned OFF). In accordance with one or more features of the present disclosure, during the countdown timer period, at a predetermined period of time prior to reaching zero and changing the state of the load (e.g., turning OFF the connected load (e.g., lights)), the occupancy sensor 100 emits a verbal notification to elicit feedback from any occupant located in the monitored space. That is, for example, during the countdown period, prior to hitting zero and turning OFF the lights, the occupancy sensor 100 emits a verbal notification that the lights are about to be turned OFF. In response, an occupant in the monitored space may respond by moving and/or by emitting a verbal response. Upon detection of the movement via the occupancy sensing element and/or the verbal response via, for example, a microphone 180, the occupancy sensor 100 resets the countdown timer and thus avoids inadvertently turning OFF the lights in the monitored space.

Figure 5:
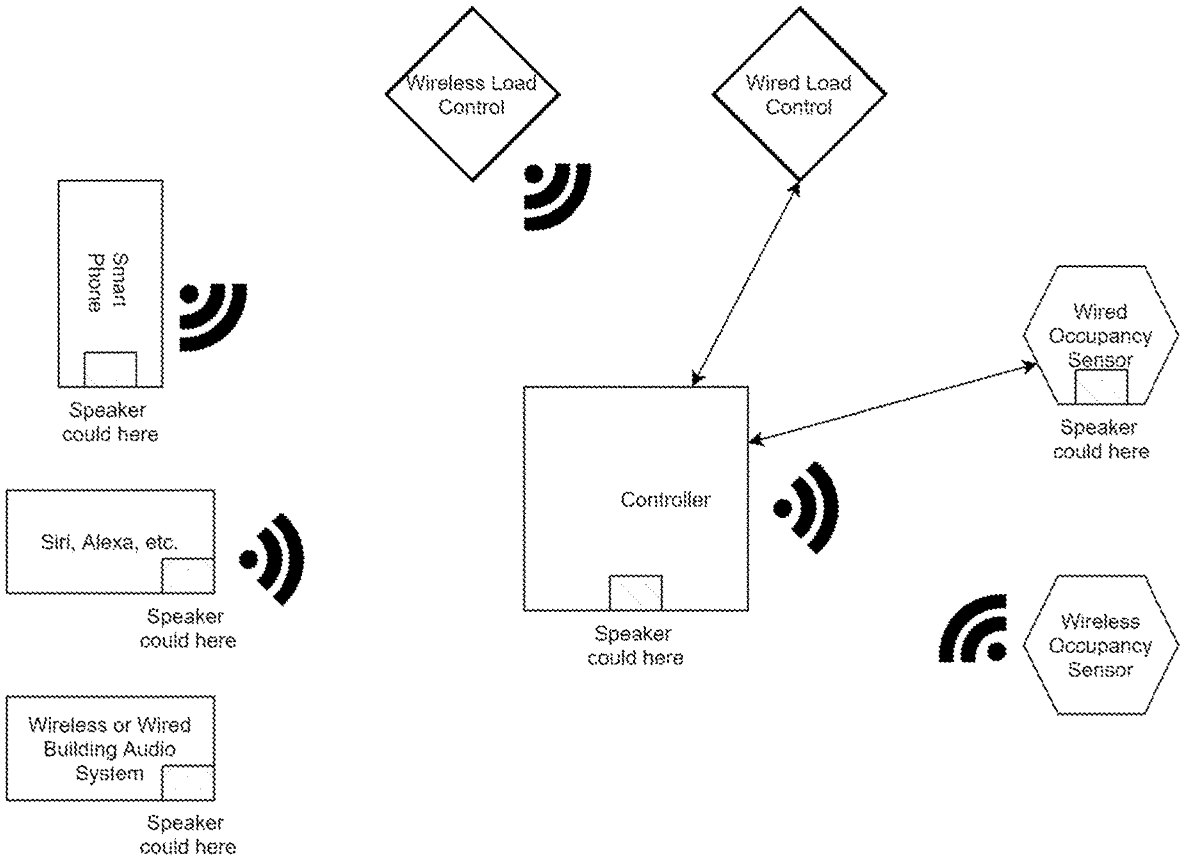
FIG. 5 illustrates a schematic view of an embodiment of a networked system in accordance with one or more features of the present disclosure.

As such, in accordance with one or more features of the present disclosure, the occupancy sensor 100 is arranged and configured to emit a verbal notification before turning OFF the lights. In some embodiments, as will be described herein, the transmitter is a speaker 175 for transmitting the verbal notification (e.g., the occupancy sensor 100 includes, or is communicatively coupled with, a speaker 175). Alternatively, the transmitter may be arranged and configured to communicate, either wirelessly or via a wired connection, to a remote device for relaying the verbal notification, as will be described in greater detail herein. For example, as schematically illustrated in FIG. 5, the occupancy sensor could be part of a networked system including, for example, a controller, one or more occupancy sensors (e.g., wireless occupancy sensors), an audio system, a smart phone, a Siri, Alexa, or equivalent device. In use, the speaker could be located anywhere in the system. In addition, the speaker could be communicatively coupled either wirelessly or wired. In use, the occupancy sensor could be configured to transmit a signal to, for example, the controller, which could be configured to transmit a signal to the other components including, for example, the speaker to transmit a verbal notification.

In use, during the countdown timer period, at a predetermined period of time prior to turning OFF the light, the occupancy sensor 100 emits a verbal notification to elicit feedback from any occupant in the monitored space. If no response is received, the countdown timer will hit zero and the lights will be turned OFF. If a response such as, for example, a verbal response and/or movement, is received, the countdown timer will reset and the lights will remain ON.

In some embodiments, the verbal notification may be emitted at 10 seconds, 20 seconds, 30 seconds, or the like prior to the countdown timer reaching zero.

In a preferred embodiment, as illustrated, the occupancy sensor 100 includes a speaker 175 for transmitting the verbal notification. That is, for example, the transmitter is a speaker and the verbal notification may be a verbal command transmitted by the speaker 175 included within the occupancy sensor 100. The verbal command may be, for example, "lights scheduled to turn OFF in 30 seconds" or "Is anyone in the room?" Alternatively, as previously mentioned, the transmitter may be arranged and configured to communicate with a remote device. For example, for larger, networked systems, one or more audio components housed within a separate enclosure could be part of the system. Alternatively, in connection with connected homes or offices, the emitted verbal notification may come from Siri, Alexa, or the like (e.g., the occupancy sensor may include a transmitter for transmitting a signal to a connected Siri, Alexa, or the like for relaying the verbal notification). In another embodiment, the occupancy sensor may include a transmitter for wirelessly connecting to, for example, an occupant's smartphone, tablet, computer, or the like (e.g., the occupancy sensor may be in wireless communication with an APP located on the occupant's smartphone, tablet, computer, or the like). In such embodiments, the verbal notification may be transmitted to the APP where it is then relayed to the occupant. For example, in some embodiments, the emitted verbal notification may be a message, or some other notification such as, for example, a SMS message, a ping, an alert, or the like, transmitted by the smartphone, tablet, computer, or the like.

Figure 2:
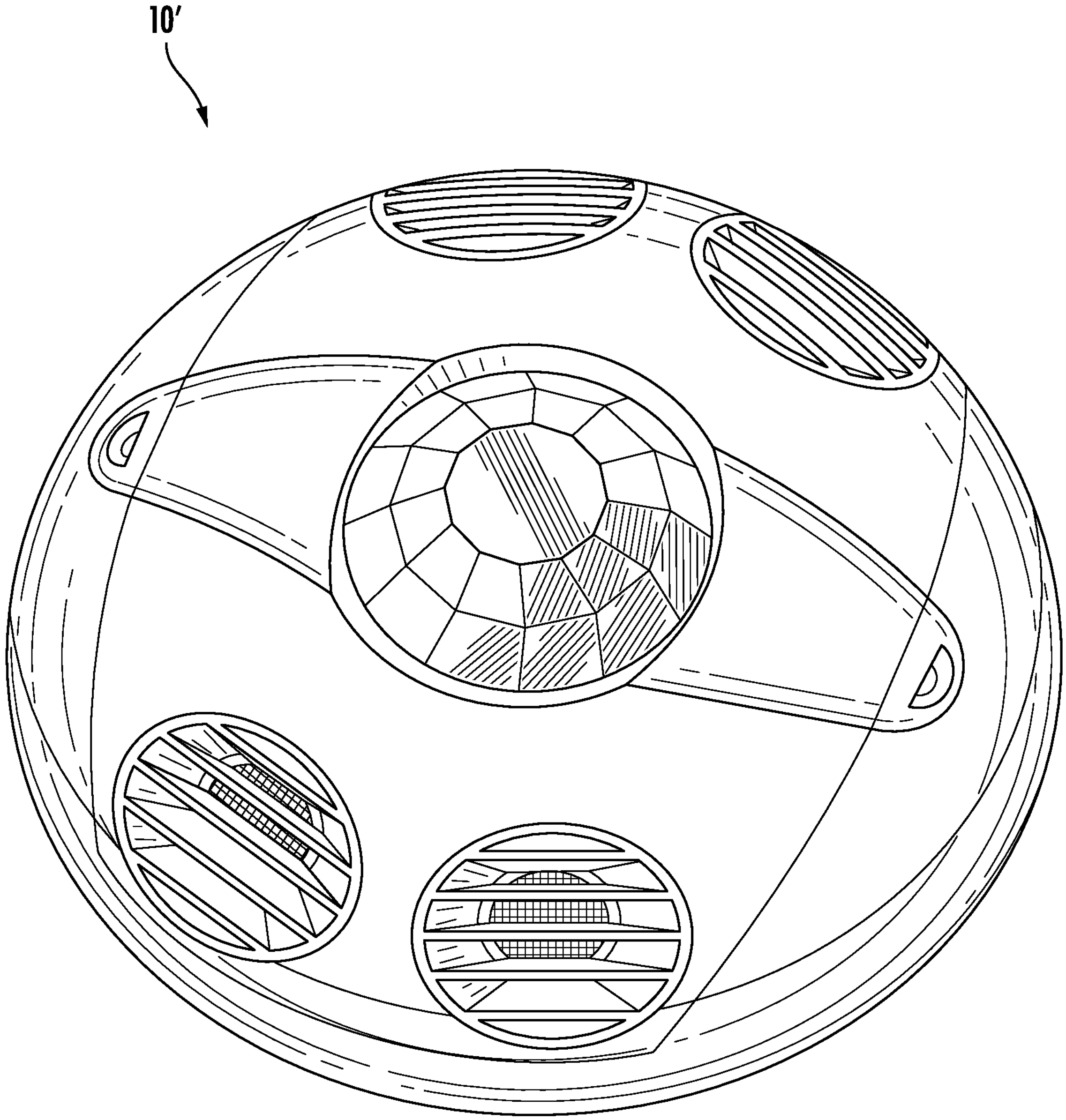
FIG. 2 illustrates a perspective view of an embodiment of a conventional ceiling mounted occupancy sensor.

In use, the occupancy sensor 100 may have any suitable configuration now known or hereafter developed. For example, in some embodiments, the occupancy sensor 100 may be configured as a wall box sensor (as illustrated in FIG. 1) arranged and configured to be positioned within a standard single gang wall box. Alternatively, the occupancy sensor 100 may be configured as a ceiling mounted sensor (as illustrated in FIG. 2) or may be part of a larger networked system.

In use, the occupancy sensor 100 provides one or more additional layers of protection from false Offs by allowing the sensor 100 to verbally notify any occupants in the monitored space that the lights (or other load) are going to be turned OFF. In response, any occupant in the space, can either verbally override the lights from being turned OFF by responding to the occupancy sensor 100 or by simply moving to be noticed by the occupancy sensor 100 and thereby resetting the countdown timer to its maximum valve, or some other preset value. That is, for example, in some embodiments, the occupancy sensor may include a microphone 180 for detecting a verbal response from the occupant in response to the transmitted verbal command.

An exemplary method for operating the occupancy sensor and for controlling a load will now be described. Generally speaking, the occupancy sensor 100 may have two states, the first termed the "unoccupied" state, and the second termed the "occupied" state. During the unoccupied state, the occupancy sensor 100 runs a constant (or periodic/recurring) loop looking for occupancy (e.g., motion). Once occupancy (e.g., motion) is detected by the occupancy sensing element 150, the load (e.g., lights) coupled thereto may be turned ON and an "occupied" loop begins to run. Alternatively, the load (e.g., lights) may be turned ON by a user when entering the monitored space by, for example, activation of an electrical switch, either located within the occupancy sensor or operatively coupled thereto.

As part of the "occupied" loop, a countdown timer is activated, which begins to count down from a maximum (reset) value of 100 (e.g., 100 percent) down to zero (e.g., zero percent). In some embodiments, the maximum (reset) valve may be selectively adjustable by the end user. For example, in some embodiments, the maximum (reset) value may be, for example, 2 minutes, 5 minutes, 10 minutes, 30 minutes, or the like. When the countdown timer reaches zero, the state of the load is changed (e.g., the lights are turned OFF).

Thus, with the monitored space unoccupied, the load (e.g., lights) is OFF and the countdown timer is at zero. In this state, the occupancy sensor 100 waits for motion detection or activation of the electrical switch to manually turn ON the load. Once motion is detected, which may be caused, for example, by an occupant entering the space, the lights are turned ON and the countdown timer is reset to 100 percent. Subsequently, the countdown timer begins to decrement. During this time period, anytime motion is detected by the occupancy sensing element, the countdown timer is reset to 100 percent. This continues until the countdown timer reaches zero indicating that no motion has been detected, which causes the lights to be turned OFF.

In accordance with one or more features of the present disclosure, prior to the countdown timer reaching zero, a verbal notification is emitted. If no response is received from the emitted verbal notification, the countdown timer continues to decrement until it reaches zero and turns OFF the lights. However, if in response to the verbal notification, a response is received, either a verbal response from one or more occupants or motion detection, the countdown timer resets to 100 percent and the lights remain ON.

In some embodiments, the speaker and verbal notification may be utilized in addition to, or in place of, a "Blink Warn" system wherein a current lighting system is configured to transmit a signal to blink or flicker the lights at a predetermined time during the countdown time period prior to turning OFF the lights.

The foregoing description has broad application. While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments. Rather these embodiments should be considered as illustrative and not restrictive in character. All changes and modifications that come within the spirit of the invention are to be considered within the scope of the disclosure. The present disclosure should be given the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. Unless otherwise defined, all technical terms used herein have the same meaning as commonly understood by one of ordinary skill in the art to which the disclosure belongs.

Directional terms such as top, bottom, superior, inferior, medial, lateral, anterior, posterior, proximal, distal, upper, lower, upward, downward, left, right, longitudinal, front, back, above, below, vertical, horizontal, radial, axial, clockwise, and counterclockwise) and the like may have been used herein. Such directional references are only used for identification purposes to aid the reader's understanding of the present disclosure. Such directional references do not necessarily create limitations, particularly as to the position, orientation, or use of this disclosure. As such, directional references should not be limited to specific coordinate orientations, distances, or sizes, but are used to describe relative positions referencing particular embodiments. Such terms are not generally limiting to the scope of the claims made herein. Any embodiment or feature of any section, portion, or any other component shown or particularly described in relation to various embodiments of similar sections, portions, or components herein may be interchangeably applied to any other similar embodiment or feature shown or described herein.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. Furthermore, references to "one embodiment" of the present disclosure are not intended to be interpreted as excluding the existence of additional embodiments that also incorporate the recited features.

In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited. It will be further understood that the terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

The phrases "at least one", "one or more", and "and/or", as used herein, are open-ended expressions that are both conjunctive and disjunctive in operation. The terms "a" (or "an"), "one or more" and "at least one" can be used interchangeably herein.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

What is claimed is:

1. An occupancy sensing system arranged and configured to monitor occupancy in a monitored space, the occupancy sensing system arranged and configured to transmit a state change signal to change a state of a load upon determining the monitored space is vacant, the occupancy sensing system comprising:

an occupancy sensor including:

a processor; and a receiver arranged and configured to detect a presence of an occupant in the monitored space, the receiver arranged and configured to receive a signal that indicates the monitored space is occupied; and a speaker operatively connected to the occupancy sensor, the speaker arranged and configured to transmit a verbal notification to an occupant in the monitored space at a predetermined time prior to changing the state of the load;

wherein upon receiving the signal that indicates the monitored space is occupied, canceling the operation to change the state of the load.

2. The occupancy sensing system of claim 1, further comprising:

a load control device arranged and configured to selectively change the state of the load in response to determining that the monitored space is vacant, the load control device communicatively coupled to the occupancy sensor; and a countdown timer arranged and configured to count down from a maximum value to zero;

wherein the speaker is arranged and configured to transmit the verbal notification at the predetermined time prior to the countdown reaching zero.

3. The occupancy sensing system of claim 2, wherein the occupancy sensor further includes a housing; and wherein the processor, the receiver, the load control device, the countdown timer, and the speaker are all positioned within the housing of the occupancy sensor.

4. The occupancy sensing system of claim 2, wherein the occupancy sensor further includes a housing; and wherein the processor and the receiver are positioned within the housing of the occupancy sensor, the speaker is positioned in a separate housing from the housing of the occupancy sensor.

5. The occupancy sensing system of claim 2, wherein the countdown timer is arranged and configured to reset to the maximum value upon receiving the signal indicating that the monitored space is occupied.

6. The occupancy sensing system of claim 2, wherein, when the countdown timer reaches zero, the state change signal is transmitted and the state of the load is changed.

7. The occupancy sensing system of claim 1, wherein the receiver is selected from one of a passive infrared (PIR) sensor, an ultrasonic sensor, an acoustic sensor, a video sensor, a microwave sensor, and a combination thereof.

8. The occupancy sensing system of claim 1, wherein the verbal notification is transmitted within the monitored space to elicit feedback from the occupant in the monitored space.

9. The occupancy sensing system of claim 1, wherein the verbal notification is arranged and configured to inform the occupant in the monitored space that the state of the load is about to be changed.

10. The occupancy sensing system of claim 1, wherein, in response to the verbal notification, receipt of the signal that indicates the monitored space is occupied, resets the countdown timer to the maximum value.

11. An occupancy sensor arranged and configured to monitor occupancy in a monitored space, the occupancy sensor comprising:

a housing;

a processor;

an occupancy sensing element arranged and configured to detect a presence of an occupant in the monitored space, the occupancy sensing element communicatively coupled to the processor;

a load control device arranged and configured to selectively change a state of a load coupled thereto, the load control device communicatively coupled to the processor;

a countdown timer arranged and configured to count down from a maximum value to zero, the countdown timer communicatively coupled to the processor; and a speaker arranged and configured to transmit a verbal notification to an occupant in the monitored space at a predetermined time prior to the countdown reaching zero.

12. The occupancy sensor of claim 11, wherein the occupancy sensing element is selected from one of a passive infrared (PIR) sensor, an ultrasonic sensor, an acoustic sensor, a video sensor, a microwave sensor, and a combination thereof.

13. The occupancy sensor of claim 11, wherein the countdown timer is arranged and configured to reset to the maximum value every time the presence of the occupant is detected.

14. The occupancy sensor of claim 11, wherein, when the countdown timer reaches zero, a signal is transmitted to the processor and the load is turned OFF.

15. The occupancy sensor of claim 11, wherein the notification is a verbal notification transmitted within the monitored space to elicit feedback from the occupant in the monitored space.

16. The occupancy sensor of claim 11, wherein the verbal notification is arranged and configured to inform the occupant in the monitored space that the state of the load is about to be changed.

17. A method for controlling a load in a monitored space, the method comprising:

detecting occupancy via an occupancy sensor in the monitored space;

initiating a countdown time, the countdown timer decrementing from a maximum value to zero;

resetting the countdown timer to the maximum value upon each occurrence of occupancy detection;

transmitting a verbal notification via a speaker to an occupant in the monitored space at a predetermined period of time prior to the countdown timer reaching zero; and one of changing a state of the load upon the countdown timer reaching zero or resetting the countdown timer to the maximum value in response to detecting occupancy from the transmission of the verbal notification.

18. The method of claim 17, wherein the verbal notification is transmitted by the occupancy sensor indicating that the state of the load is about to be changed.

19. The method of claim 18, wherein in response to the verbal notification, an occupant physically moves.

20. The method of claim 18, wherein in response to the verbal notification, an occupant provides a verbal response.

* * * * *